Aug. 2, 1938.     W. W. HAMILL     2,125,559
COUPLING FOR THE TRANSMISSION OF POWER OR MOVEMENT
Filed June 24, 1935     4 Sheets-Sheet 1
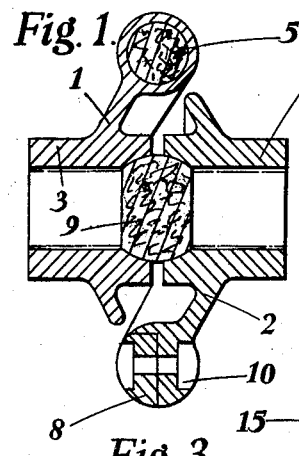
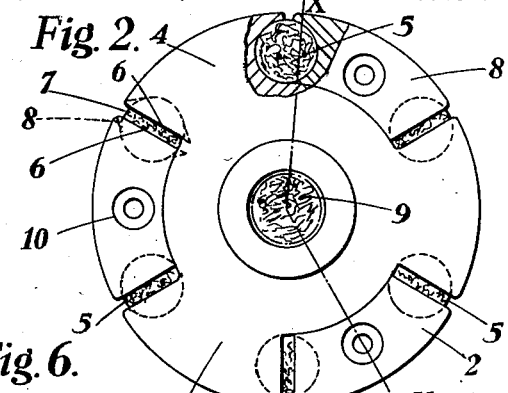
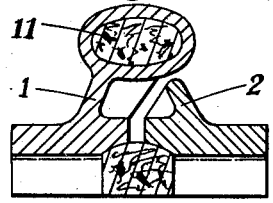
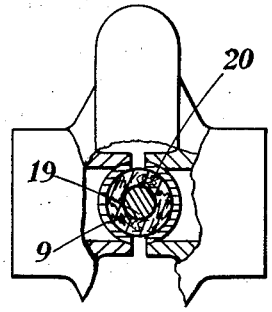
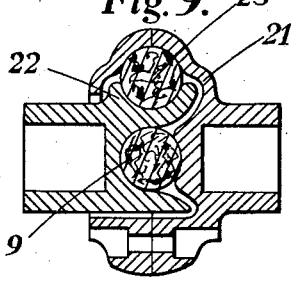
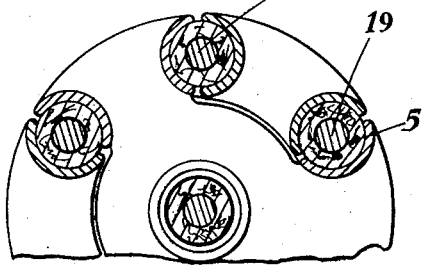
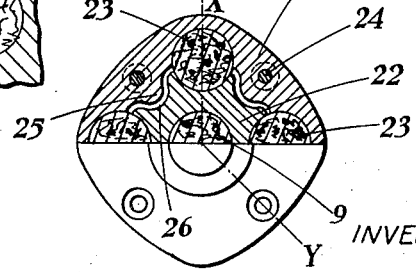
INVENTOR
William W. Hamill
BY
William Davis
ATTORNEY Aug. 2, 1938.   W. W. HAMILL   2,125,559
COUPLING FOR THE TRANSMISSION OF POWER OR MOVEMENT
Filed June 24, 1935   4 Sheets-Sheet 2
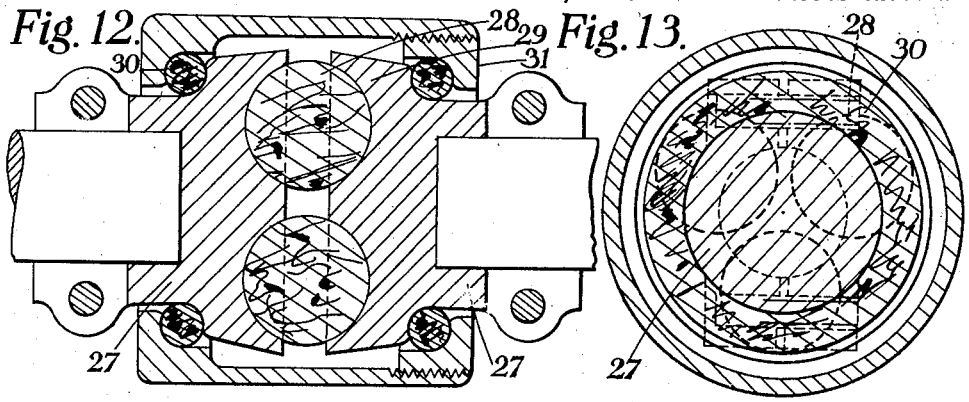
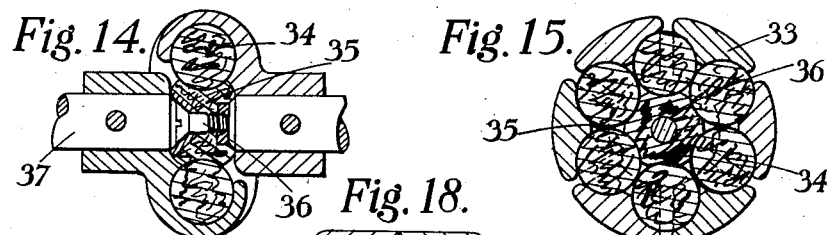
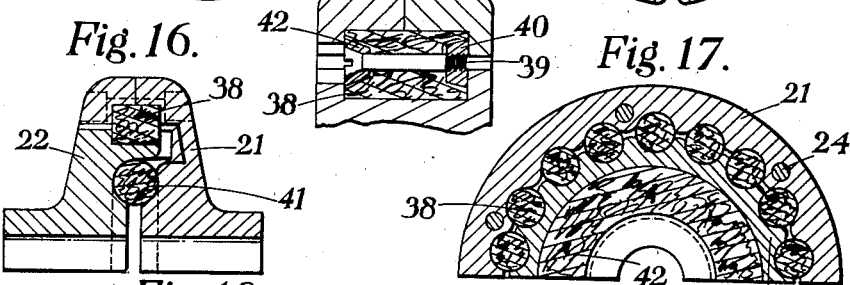
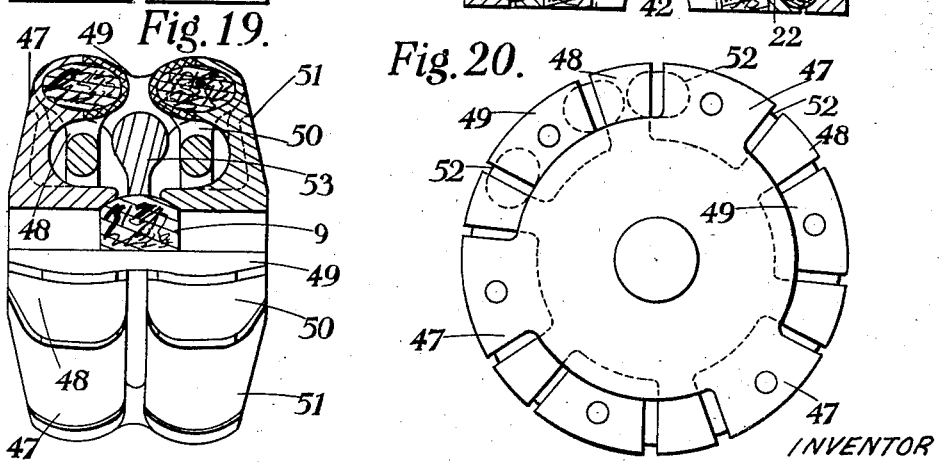
INVENTOR
William W. Hamill
BY William A. Davis
ATTORNEY

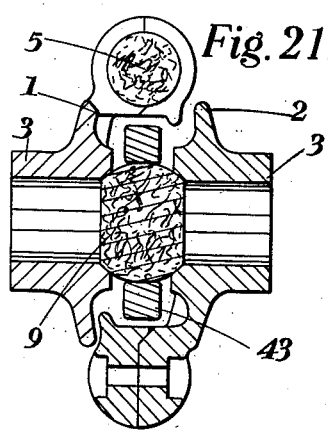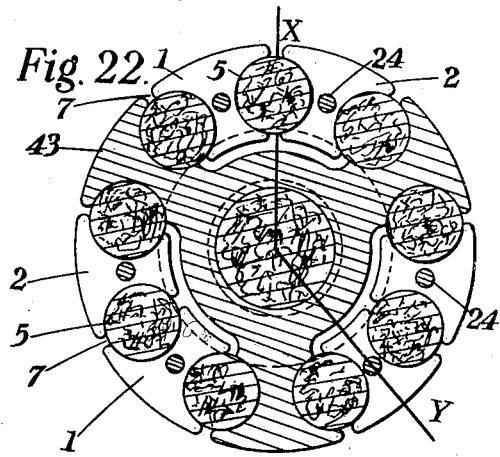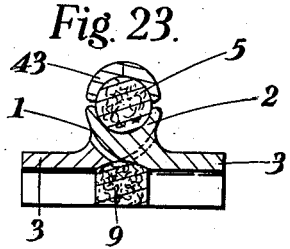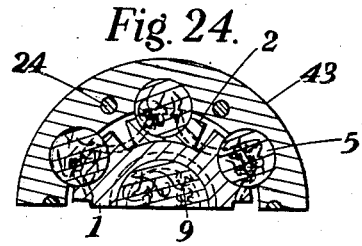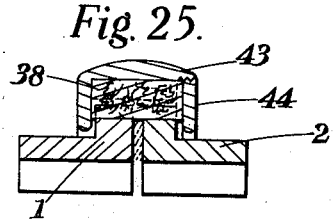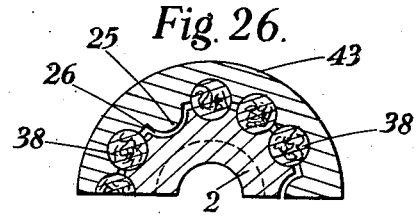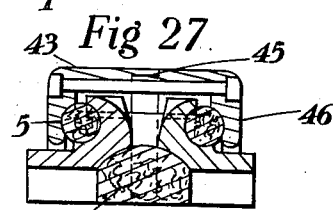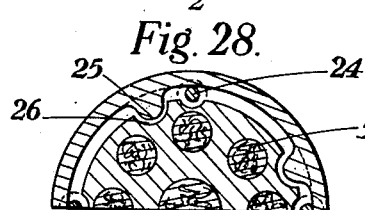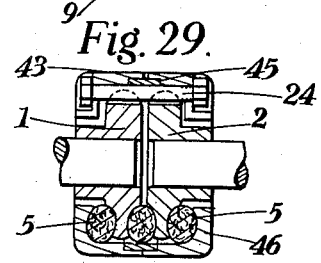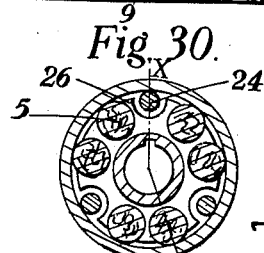

Aug. 2, 1938.   W. W. HAMILL   2,125,559
COUPLING FOR THE TRANSMISSION OF POWER OR MOVEMENT
Filed June 24, 1935    4 Sheets-Sheet 4

INVENTOR
William W. Hamill
BY
William Davis
ATTORNEY

Patented Aug. 2, 1938

2,125,559

UNITED STATES PATENT OFFICE 2,125,559

COUPLING FOR THE TRANSMISSION OF POWER OR MOVEMENT

William Wilson Hamill, Chigwell, England

Application June 24, 1935, Serial No. 28,046
In Great Britain June 26, 1934

6 Claims. (Cl. 64—14)

This invention relates to couplings of the universal joint type for transmitting rotary or oscillatory movement between shafts or parts of like function with their axes relatively co-linear or parallel or inclined, and is more particularly concerned with the kind constructed to permit of relative universal movement between the coupled shafts, that is, movement in three planes at right angles which includes endwise or plunging motion and motion transverse to the axes of the two shafts. In some known couplings, a centring device of spheroidal form of metal or non-elastic material has been used to connect the members of the coupling in addition to the coupling elements proper but the employment of such rigid centring devices inhibits the relative axial and transverse motions referred to and limits the relative motions of the coupling members to those of ball and socket character, or in other constructions to a relative rotary movement.

Couplings are known comprising a member for attachment to a driving shaft, a member for attachment to a driven shaft, and a plurality of rubber or like resilient bodies interposed between the said members in cavities therein to form the driving connection.

In order that the rubber or like bodies may carry satisfactorily the load imposed upon them, it is necessary to satisfy two conditions: one, the rubber must be subjected to initial compression by causing the complementary parts of their seatings relatively to approach, since it is not practicable to force rubber into an undersize cavity, by reason of its high co-efficient of friction; the other, the shape of the cavities in which the rubber bodies are seated must be such that the rubber is supported against excessive or undue deformation and elastic flow for the pressure to become effective. Since rubber is substantially incompressible, maximum power would be transmissible when the rubber is completely enclosed and confined, and the seatings completely filled by the rubber; but without deformation space, there would be no resilience. Moreover, relative motions in three planes at right angles would be prevented, as under this completely confined condition, the rubber acts as a rigid coupling between the two shaft members.

In a flexible coupling for transmitting rotary or oscillatory movement comprising a driving member having a plurality of spaced segmental cavities, a driven member having a plurality of spaced segmental cavities complementary to those in the driving member, a plurality of rubber or like resilient bodies seated partly in the driving member and partly in the driven member in said cavities, and means for causing the complementary parts of the cavities to approach for applying initial compression to said rubber or like bodies, the invention consists in a modification to the shape or structure of the cavities which closely fit, confine and support the rubber or like bodies over substantially the whole of their surface except at the parts which lie in the clearance space intermediate the coupling members, so that initial compression can be applied to the bodies without their deforming and losing the benefits of the compressive pressure. The close fitting character of the cavities also inhibits relative motion or rolling of the rubber bodies along or within their seatings, so that the various relative motions of the coupling members are accommodated solely by flexure of the rubber bodies; and, further, by so compressing and supporting the rubber bodies, a smaller coupling will transmit the same power, or alternatively a given size coupling will transmit more power. Economy in space occupied and cost of manufacture are of material commercial advantage.

In order that the invention may be clearly understood and readily carried into practice, reference may be had to the appended drawings in which:

Figure 1 is a sectional elevation of a two-element coupling, the section plane being indicated by XY of Figure 2 which is an end view of Figure 1.

Figure 3 is a half sectional elevation and Figure 4 an end view of a coupling similar to that of Figures 1 and 2, but with ovoid instead of spherical elastic bodies.

Figure 5 is a fragmentary view showing the ovoid body arranged in a different manner.

Figure 6 is a fragmentary view of a seating rebated for a rubber body.

Figures 7 and 8 illustrate in end and side elevation a form of two-part coupling in which the elastic bodies transmit torque by shearing stresses, instead of by compression as in the preceding embodiments.

Figures 9 and 10 show a simple form of three-part two-element coupling suitable for light loads.

Figure 11 is a fragmentary view showing a rubber body with a stop collar.

Figures 12 and 13 are sectional elevations of an embodiment in which the rubber bodies in shear are seated in cavities formed in the proximate end faces of the shaft members.

Figures 14 and 15 indicate a coupling for assembly before fixing to the shafts.

Figures 16 and 17 show a coupling having elastic bodies of circular cross-section to transmit torque under shearing stress.

Figure 18 is a fragmentary view showing the application to the rubber bodies of means for compressing them axially after assembly of the coupling.

Figures 19 and 20 illustrate a form of coupling having five elements arranged in sequence.

Figures 21 and 22 show a coupling similar to that of Figures 1 and 2 but with a third and floating element interposed between the two shaft members.

Figures 23 and 24 indicate a three-element coupling having the rubber bodies arranged to transmit torque by shear stress.

Figures 25 and 26 are views of a coupling similar to that of Figures 23 and 24 but with cylindrical instead of spheroidal rubber bodies.

Figures 27 and 28 have the rubber bodies seated in the outer end faces of the two shaft members, while Figures 29 and 30 show in addition a third group of rubber balls seated in the proximate end faces of said members.

Figure 31:
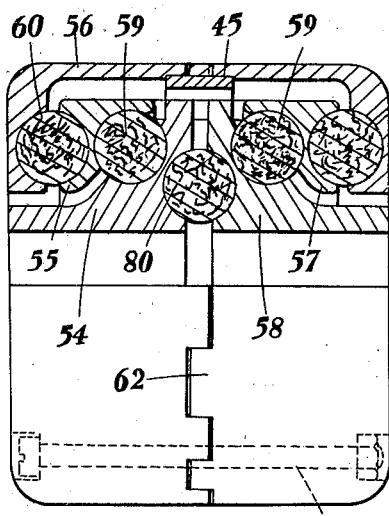
Figure 32:
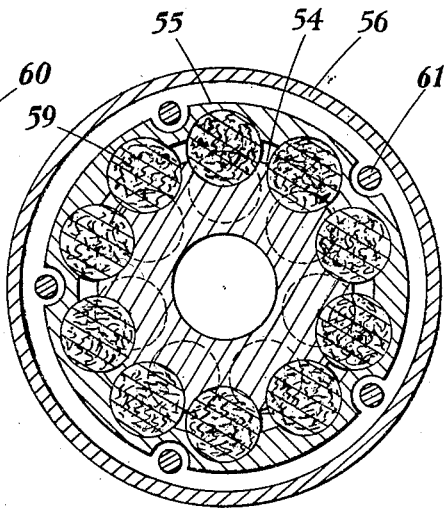
Figure 33:
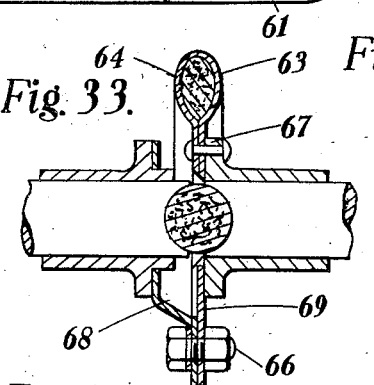
Figure 34:
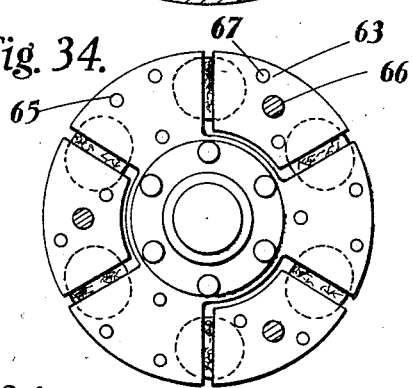

Figures 31 and 32 show another form of five-element coupling.

Figures 33 to 37 show couplings having the metal members fabricated of sheet or plate metal.

The parts of the coupling where fixed to the driving shaft and the driven shaft are suitably adapted for such connection, and as the fixing is not per se part of the invention, any known method may be used such as splines, keys, flanges, pins, contractible clips, or the like, several different methods being illustrated but not particularly described.

The elastic body or bodies can be of any desired cross-section, spherical, cylindrical, square, or other shape, being housed as to the one part in one member of the coupling and as to the other in the other member. An appropriate amount of clearance is left between the adjacent surfaces of the two members to allow relative movement between them, and they are provided with cavities which correspond approximately in shape to that part of the elastic bodies which seats therein. Any desired metal may be utilized for the members, sheet or plate steel, aluminium alloy, bronze, delta metal, pressed, cast-sand or die, forged, or otherwise fabricated. The number of rubber bodies required for a coupling will depend upon the torque to be transmitted, and to some extent upon the amount of deflection called for. I propose in some embodiments to provide additional cavities for housing extra rubber parts to enable the effective size of the coupling to be adjusted by merely inserting additional rubber parts in the spare cavities, or conversely to reduce the load capacity by removing some of the rubber parts. This flexibility of effective coupling size is useful in practice since assemblies can be made to suit particular duties.

In its simplest expression the invention comprises three functional elements: the driving member, the driven member, and the rubber bodies. One construction of this kind is illustrated in Figures 1 and 2 wherein the driving and driven members each consist of three-armed spiders 1, 2 radiating from a central hollow boss fixed to the respective shaft. At each end face of the peripheral segments 4 is a cavity approximating in shape to a hemi-sphere to house part of a rubber or like ball. The interspaces between the peripheral segments of one spider accommodate alternately the corresponding segments of the other spider, while the connecting walls between the hubs 3 and the peripheral segments converge towards the latter. Each rubber ball is thus seated partly in one spider and partly in the other spider, the assembly forming a continuous kinematic chain capable of transmitting torque and at the same time allowing a limited amount of relative universal movement between the two shafts. In this arrangement, the rubber bodies are subjected to compression by the torque, and relative circumferential movement of the driving member and the driven member is limited by contact of the spider segment radial faces 6 when the clearance spaces 7 between the adjacent pairs of faces have been taken up by yielding of the rubber bodies. Such contact will occur with cavities flared as indicated in dotted lines 8, whereas if the cavities are made to fit the rubber balls, metallic contact will be prevented by the middle part of the balls being squeezed out into the clearance spaces.

Initial compression of the rubber being desirable, one of the spiders is made with separate peripheral segments 88 and holes 10 for clamping bolts which firstly enable pressure to be put on to the rubber balls and secondly allow the coupling to be quickly divided merely by the removal of the rubber balls without requiring the removal of the spiders from their respective shafts, which has a particular advantage in the transmission systems of automobiles for facilitating access to other parts. The resistance of the coupling to the relative movement of its two parts can be varied expeditiously and conveniently by means of the bolts after assembly of the coupling.

In some applications of the invention where rotational speeds are high, it may be desirable to include in the structure a centring device. This can be done very simply by the provision of a spheroidal block of rubber interposed between the spider hubs, and by forming a seating in the inner end face of the hubs curved to a radius struck from the centre point of the coupling. The centring block is under a certain degree of compression when the coupling is in place and assists in taking up relative axial displacement of the two shafts, in addition to the centring function.

Projecting parts likely to catch when the coupling is rotating are avoided by shaping the spiders with smooth exteriors and by countersinking at 10 the bolt heads and the nuts.

Due to the absence of wearing parts, the improved couplings can be operated under water, oil or other liquid, the rubber bodies being compounded to resist the action of the liquid such as oil, when necessary.

The configuration of the rubber bodies can be modified to diminish the lateral space or the diameter of the coupling without adversely affecting the life of the rubber or the volume needed for carrying the load or for providing the required amount of relative movement of the coupling members, this characteristic being useful where space is restricted. Figures 3 and 4 show a coupling similar to that in Figures 1 and 2 but with rubber bodies 11 of ovoid shape both lengthwise and transversely, which enables the overall diameter of the coupling to be reduced, whereas in Figure 5 the rubber body is arranged so that the major axis or one of the major axes lies on a radial line to reduce the width of the members at their outer parts.

To avoid cutting the rubber bodies when deformed when the members take up a relative abaxial position, the outer ends of the cavities are rounded as at 13 Figure 4 or flared or bevelled as at 8 Figure 2, the additional cavity space functioning as deformation space in the manner before-mentioned. The cavities may be otherwise shaped to produce this effect; Figure 4 shows, in the sectioned cavity, an enlargement 14 of said cavity intermediate its ends; Figure 5 illustrates a cavity counterbored at its outer face 15, while in Figure 4 a rubber body is shown with surface cavities or holes 16 for use where the general shape of the rubber body is the same as that of the cavity in which it is seated. Another means consists of a formation of the bodies with a waist or constriction at their middle parts; or where metallic contact of the metal spiders is to be avoided, the rubber bodies are each encircled by an integral collar or loose washer 17 Figure 11 which acts as a stop.

The particular composition of rubber is selected according to the degree of angularity required in the coupling, or to the torque to be transmitted, or to the shock-absorbing property required. These requirements can be met also by modification of the construction of the rubber bodies. In Figure 8 the bodies are stiffened and re-inforced by a central nucleus 19 of metal or hard rubber, while in Figure 7 the centring rubber part is similarly re-inforced. In this figure are shown centring element seatings 20 of segmental spheroidal shape let into the hollow hubs of the coupling members.

A small coupling for machine tools and other industrial applications shown in Figures 9 and 10 includes a hollow squaroidal or rectanguloidal housing 21 which forms one member, a similar but smaller part 22 inside the housing with an interspace between them, and four rubber bodies 23 either balls or ovoids located one at each of the four corners. The housing 21 is divided into two sections clamped together by bolts 24, the rubber bodies as in the preceding constructions being capable of resisting endwise motion of the connected shafts as well as transmitting the torque. It will be seen that the torque is taken by the rubber bodies in shear stress, and it is therefore generally desirable to incorporate stop devices which function also as safety means to prevent overloading of the rubber by excessive torque and to ensure a positive drive in case of such overload or failure of the rubber bodies. With this object in view, projections 25 are formed on one of the coupling members and recesses 26 opposite the projections 25, in the other member with sufficient clearance space between to allow relative movement of the two coupling members under normal stress but to come into contact under excessive torque.

Another simple construction of two-element coupling is shown in Figures 12 and 13 wherein two duplicate disc members 27 are fixed to the two shafts and are formed on their adjacent faces with three hemi-spherical cavities to receive the three rubber balls 28. To limit endwise relative movement of the two members away from one another, a shoulder 29 is provided on each member 27 against which a rubber ring 30 is seated and held by a surrounding metal annular casing 31 of circular shape one end 32 of which is detachably connected by screw threads to the main casing.

A coupling assemblable before fixing to the shafts comprises, as illustrated in Figures 14 and 15, a duplicate pair of three-armed spiders 33 with cavities to accommodate the rubber bodies 34 of ball shape compressible from their inner parts by means of a central rubber ring 35 which itself is compressed axially by a screw 36 and nut with interposed metal anti-friction washers, the enlargement of the periphery of the ring 35 holding the balls 34 firmly in their cavities or seats. The latter extend for more than half of the ball periphery so that the coupling will take up endwise or plunging motion as well as torque. Since an unscrewing action of the compressing screw 36 is prevented by the proximate ends of the two coupled shafts 37, disconnection of the two coupling members is prevented.

As before-mentioned, the rubber bodies can be of any desired suitable shape, cylindrical bodies being shown in Figures 16 and 17 wherein the construction is similar to that of Figures 9 and 10 with the rubber bodies transmitting the torque by shear stress, but with the seatings in the two coupling members 21, 22 of approximately semi-cylindrical shape to accommodate the cylindrical rubber bodies 38.

Initial compression of the rubber bodies by compressing them externally in closing the structure may be effected alternatively or supplemented by means for applying compression after assembly of the parts. By such subsequent application of compressive pressure, the resistance offered by the coupling to relative movement of the connected shafts is variable in a simple and convenient manner, preferably by screw means. In Figure 18, each rubber body has an axial aperture through which passes a tension bolt or screw 39 to engage a nut 40 for applying endwise pressure. Between the head of the screw and a counterbore in the rubber cylinder 38 is interposed a loose washer 42 of slightly different slope from the conoidal head of the screw to reduce frictional drag and prevent twisting of the rubber. The two parts in contact with the end faces of the rubber cylinder can be coned to any desired angle to vary the radial pressure distribution curve along the length of the cylinder. Alternatively, the cavities, or the screw, or the bore of the cylinder are modified in shape to vary the said curve.

Another form of centring device consists of a rubber or like ring 41 Figures 16 and 17 of cylindrical cross-section placed between the two adjacent inner faces of the coupling members intermediate their hubs and the circle of rubber bodies, said ring functioning also to assist in taking axial thrust of the members.

The constructions described have the parts so arranged that the rubber or like bodies form a single series or group; where greater relative movement of the connected shafts is required, modified constructions are used which have the characteristic of two, three, or more groups of rubber or like bodies which act in such a manner that each group contributes its quota of relative movement the summation of which augments the total possible yield of the coupling in the various directions in which movement is provided for. Figures 21 to 30 show various constructions having the common features of a third member interposed and floating between the two members fixed to the connected shafts, and two groups of rubber or like bodies the first of which yieldingly connects the driving member and the floating member, and the second of which yieldingly connects the floating member and the driven member. In Figures 21 and 22 the three members 1, 43 and 2 have the shape of three-arm spiders the peripheral sections of which have hemi-cavities to suit the shape of rubber bodies used, balls 5 being generally most convenient. The balls transmit torque by shear stress while the hub of the floating member 43 encircles and is centred by the spheroidal rubber block 9 which centres also the driving and the driven coupling members. In this construction, the rubber balls are introduced between the two shaft spiders as well as between the shaft spiders and the floating member.

A construction in which the rubber bodies transmit the torque by shear stress is illustrated in Figures 23 and 24 wherein the floating member surrounds the shaft members 1, 2 and the torque is transmitted from one of the shaft members through half of the total number of rubber balls to the floating member, and thence through the remaining balls to the other shaft member, the action being a series one as distinguished from one in which all the balls act in parallel.

In the modified construction shown in Figures 25 and 26, the rubber bodies 38 are cylinders which take the torque in shear stress, and the floating member is an annulus of U cross-section closed by an end cap 44 screwed therein, instead of closure by bolts.

A construction by which the rubber bodies have their plane of shear transverse to the axis of rotation instead of parallel thereto involves an emplacement of the bodies on the faces of the shaft members. Figures 27 and 28 show the shaft members formed as discs with facial cavities, the floating member being constructed as a built-up casing with halves of L section spigotted together at 45 and held together by bolts, the ball-accommodating cavities being formed in the inner faces of the radial end flanges 46.

Where bolts are employed for securing together the sections of a divided member, said bolts may be incorporated to serve as the before-mentioned stops and positive driving means. A construction of this kind appears in Figures 29 and 30 in which the bolts 24 of the floating member (which are parallel to the coupling axis of rotation) are normally clear of furrows 26 formed in the periphery of each of the shaft members; under excessive load, the peripheries of the bolts come into contact with the side walls of their relevant furrows and positively connect the two shaft members and limit their relative rotatory movement. In the embodiment, is shown a third row of rubber balls seated in cavities in the adjacent faces of the two disc-like shaft members. In addition to the coupling effected by the two outer rows of balls and the floating member, there is some degree of direct coupling by the intermediate row of rubber balls which act in a similar manner to the rubber bodies interposed between the two shaft members in Figures 21 and 22.

Where still greater amplitudes of relative motion between the connected shaft are required, the number of groups of rubber or like elastic bodies which act in series or cumulatively is increased. In Figures 19 and 20 a five-element coupling is illustrated. In sequence, the five elements are represented by a shaft member 47; a floating member 48 interposed between 47 and a middle floating member 49; another single floating member 50 similar to 48; and a shaft member 51. The two shaft members, which can be duplicates, each have three arms and each such arm has at its outer end semi-cavities one on each radial face wherein are seated parts of rubber bodies 52 arranged to transmit torque by compression similar to the coupling shown in Figure 2. Each of the single floating members 48, 50 has six radial arms which can be regarded as three pairs, one pair embracing each of the intermediate arms appeartaining to the shaft members 47 and 51 respectively. The common floating member 49 connects the two halves of the coupling and, like the general arrangement of the coupling, is symmetrical about the transverse axis as will be clear from Figure 19, said member 49 having three arms to the left and three to the right of said axis, with connecting webs and an annular centre 53 centred by a rubber ball 9. The drive is transmitted from first shaft member 47 to first floating member 48, thence to the common floating member 49, thence to second floating member 50, and finally to the second shaft member 51, or in the reverse sequence according to which end is the driving one, each member and group of rubber bodies providing some amount of relative movement, the additive effect of which gives the desired flexure circumferentially, transversely, and axially.

A four-element coupling with rubber balls in shear stress for torque transmission forms the subject of Figures 31 and 32. Another modification consists in arranging some of the rubber bodies to project from inclined faces instead of from radial or axially-directed faces as shown in the preceding illustrations. The shaft members 54, 58 have their outer faces inclined at an angle conveniently 45° to the rotational axis in which faces hemi-spherical cavities are formed to house the rubber bodies 59, this arrangement yielding a compact construction of multi-element coupling. The floating members 55, 57 have their corresponding faces inclined at 45° and their outer faces radial to co-act with the balls 60 and the inner faces, which are radial, of the channel-section two-part casing 56 which encloses the various groups of rubber bodies and their members. The casing is held together by recessed bolts 61 with their axes parallel to the rotational axis, which bolts as shown in Figure 32 operate as positive driving means and limiting stops under certain conditions in the manner already explained. Tongues 62 and grooves on the mating halves of the casing take the torque and an insert ring on the two halves aligns the two halves. A middle group of rubber balls 80 is interposed directly between and seated in the adjacent inner faces of the shaft members 54 and 58, and operates in like manner to the corresponding balls in Figure 29.

In the constructional forms illustrated in Figures 1–32 it is convenient to manufacture them of non-ferrous metals such as aluminium alloys, bronze, delta metal, and the like either sandcast, die-cast, or forged, but the main metal parts may be adapted for fabrication from sheet or plate metal. Figures 33–37 show such forms. Two similar discs of sheet or plate metal can be fashioned to provide substantially the whole of the metal work required to form the two spiders for a two-element coupling, a coupling of this character being shown in Figures 33 and 34. A disc is processed to leave a number of radial arms 63 separated by intervening spaces which arms are subsequently shaped at their outer ends or edges to form quadri-cavities of a configuration appropriate for the particular shape of rubber bodies it is desired to use. In the drawings, ovoids are illustrated. Sectors removed when blanking out the disc are utilized as the complementary pieces 64, are pressed at their ends like the disc arms to a shape suitable for housing the rubber bodies, and are welded to the disc or fixed by rivets 65 in the case of one of the discs, though the structure can be closed by first inserting the rubber ovoids and then riveting the complementary pieces in place. For a separable coupling, the sectors pertaining to one disc are attached in a removable manner by bolts 66 and are registered by dowells 67 integral or attached. Said assembly bolts are usable to vary the amount of initial compression set up on the rubber bodies during assembly, the sectors of both discs being provided with bolts. The members are constructed for attachment or connection to the driving and the driven shafts, either by being plunged to a hollow hub formation, or shaped to form part of a flange coupling 67. As will be apparent, the splaying of the centres of the two members may be confined to one as indicated at 68 with the other disc centre 69 flat, or the two discs may be equally splayed and made identical for economy in manufacture. In this arrangement, the rubber bodies are in compression for transmission of torque.

Figure 35:
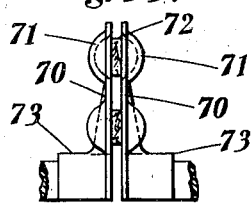
Figure 36:
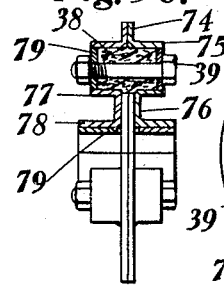
Figure 37:
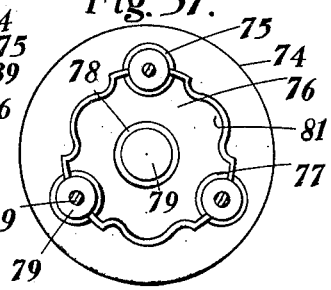

A simple form in which the rubber or like bodies are in shear for torque transmission is depicted in half elevation in Figure 35. Therein, the shaft members consist of discs 70 of plate metal with a number of bulges 71 pressed in one face to form the cavities for the rubber bodies 72 of spheroidal, ovoid, cylindrical, or other suitable shape, and drawn and plunged to provide the hollow hubs 73 for attachment to the shafts. In this construction, the assembly is made when the coupling is fixed to the shafts, since it does not permit of pre-assembly. The shear plane of the rubber bodies is parallel to the plane of rotation, whereas in the construction Figures 36 and 37, the shear plane is coaxial with the rotational axis, three elements instead of two are included, and the co-operation of the several parts is similar to those of Figures 25 and 26. Two discs of metal plate serve to provide the metal work for the three members, the outer sections being used for the floating member, and the inner sections for the shaft members. Said outer sections comprise flat rings 74 welded back to back and preformed by pressing and plunging a number of semi-cylindrical bosses 75 projecting from the outer faces. Shaft members include a radial flange 76, semi-cylindrical bosses 77, and hub bosses 78, with or without hardened insert sleeve 79. Rubber bodies 38 are of cylindrical shape enlarged by axial compression by bolts 39 through the centre of the apertured cylinder, fitted with nuts and end plates 79 of metal.

Relative movement of the coupling members takes place by deformation of the rubber or like elastic bodies, and thus the improved couplings work without noise or mechanical wear; the rubber provides inherent self-damping due to internal friction, but generated heat is readily conducted and dissipated into the air by the metallic seatings and the cooling effect due to rotation or oscillation of the coupling. The di-electric property of the rubber enables the couplings to be used in places where explosive or inflammable gases are present, or in dusty or sandy atmospheres where wearing parts are undesirable; sound or other vibrations are intercepted damped and absorbed by the rubber bodies, preventing transmission of such vibrations from one shaft to the other.

Having thus described my invention, what I claim is:

1. In a flexible coupling for transmitting rotary or oscillatory movement comprising a driving member having a plurality of spaced segmental cavities, a driven member spaced from the driving member and having a plurality of spaced segmental cavities complementary to those in the driving member, said cavities being arranged in a plane concentric to and beyond the driving and driven member, a plurality of rubber or like resilient bodies seated partly in the driving member and partly in the driven member in said cavities, and means for causing the complementary parts of the cavities relatively to approach for applying initial compression to said bodies; cavities which are shaped to fit closely, confine and support the rubber or like bodies over substantially the whole of their surface except at the parts which lie in the clearance space intermediate the coupling members so that initial compression can be applied to the bodies without deformation thereof except at the said parts in the clearance space, relatively universal movement between the member including motions transverse to their axes and endwise being accommodated solely by flexure of the supported rubber bodies and not by rolling of the bodies along the surface of the cavities.

2. Coupling according to claim 1 having means for causing the complementary parts of the cavities relatively to approach in a direction parallel to or substantially aligned with the axis of the driving or the driven member for effecting the initial compression in an axial direction.

3. A flexible coupling for transmitting rotary or oscillatory movement comprising a driving member having a plurality of spaced segmental cavities, a driven member having a plurality of spaced segmental cavities complementary to those in the driving member, a plurality of rubber or like resilient bodies seated partly in the driving member and partly in the driven member in said cavities, means for causing the complementary parts of the cavities relatively to approach for applying initial compression to said rubber or like bodies, said cavities closely fitting confining and supporting the rubber bodies over substantially the whole of their surface, a recess in each of the adjacent ends of the said shaft members, and a resilient centring device seated in the two complementary recesses to accommodate by compression and expansion relative endwise movements of said members, and by shear relative transverse movements of said members.

4. Flexible coupling for transmitting rotary or oscillatory movement comprising a shaft member having a plurality of spaced arms, another shaft member having a plurality of arms arranged to alternate with and spaced from the arms of the first shaft member, cavities in the end faces of the said arms, rubber or like resilient bodies seated in said cavities, the cavities in one of the members being formed partly in the arms and partly in segments movably attached to the arms, and screw means for moving said segments in an axial direction to reduce the volume of the cavities and apply initial compressive pressure to the rubber bodies in said axial direction, said members being spaced apart and said bodies being arranged to allow relative universal movement between the members including motions transverse to their axes and endwise.

5. A flexible coupling for shafts arranged in axial alignment and otherwise disconnected, comprising an annular series of resilient bodies arranged in a plane concentric with and beyond both shafts, means for exerting initial compression on said bodies in the normal relation of the shafts and independent of shaft movement, and a compressible body interposed between the ends of the shafts and in the axial line thereof.

6. A construction as defined in claim 5, wherein the annular series of resilient bodies and the compressible body are in the same plane normal to the axial lines of the shafts.

WILLIAM WILSON HAMILL.